UNITED STATES PATENT OFFICE.

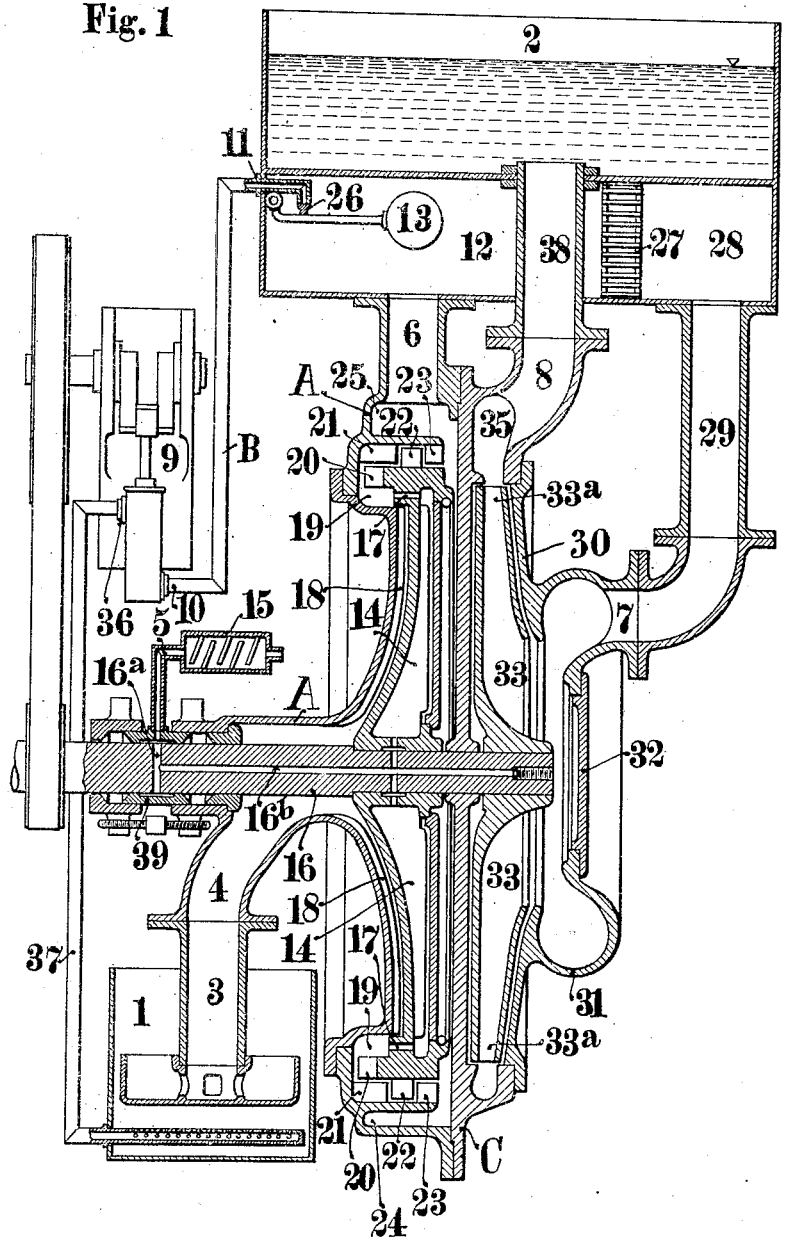

HEINRICH WEHNER, OF FRANKFORT-ON-THE-MAIN, GERMANY.

WATER-CLEANING PLANT.

1,400,129.  Specification of Letters Patent.  Patented Dec. 13, 1921.

Application filed February 16, 1916. Serial No. 78,735.

(GRANTED UNDER THE PROVISIONS OF THE ACT OF MARCH 3, 1921, 41 STAT. L., 1313.)

*To all whom it may concern:*

Be it known that I, HEINRICH WEHNER, a subject of the German Emperor, and resident of Frankfort-on-the-Main, Germany, have invented certain new and useful Improvements in Water-Cleaning Plants (for which I have filed applications in Austria, Feb. 13, 1915, in Hungary, Feb. 17, 1915, in Italy, Feb. 27, 1915, and in England May 14, 1915,) of which the following is a specification, reference being had therein to the accompanying drawing.

The present invention relates to a plant for cleaning water, especially for freeing water from gases and softening it.

The objects aspired to, especially the removal of carbonic acid from the water are attained by subjecting the water to centrifugal action under vacuum and a simultaneous through-feeding of greater quantities of air (washing air).

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein is illustrated a sectional view through the whole plant.

In these drawings 1 illustrates a crude water tank for storing the water, rich in gases or containing iron, manganese or lime. 2 is a clean water tank into which the purified water is fed. 3 is a sucking pipe, joined by the pipe 4 to the casing A which supports the conveying apparatus. The conveying apparatus comprises the dispenser or atomizer 14 and the centrifugal pump consisting of the elements 30, 31, and 33, the dispenser and pump being mounted on a common shaft. An air pump 9 serves for drawing the air out of the tank 12 and for bringing the interior of the casing A containing the dispenser 14, under vacuum, whereby the crude water is drawn through the pipe 3 and the pipe 4, out of the tank 1. At the same time a limited quantity of air is fed to the dispenser 14 through the pipe 5 by means of the ports 16$^a$ and 16$^b$ provided in the shaft 16. Prior to its entering the pipe 5 the air is freed from dust and germs by passing through an air filter 15. The air leaves the dispenser 14 through a plurality of small openings 17 arranged on the periphery of the dispenser 14, said dispenser being rapidly driven in known manner by a suitable engine, (not shown), as for instance an electric motor. Hereupon, the air mixes in the annular channel 19 with the crude water coming from the pipe 4 and entered in the meantime into the casing A of the dispenser, where it is fed between guide ribs 18. The water and the air reach the tank 12 in the form of a spray standing under a lower pressure in such manner that the same passes in common the narrow interspaces of the combs 20, 21, 22 and 23, peripherally provided for in a great number near the annular channel 19 on the dispenser 14 and its casing A, whereby the water and the air are still more intimately mixed as a result of the blows received from the combs 20 to 23. Now the mixture of water and air passes from the combs 23 into the annular channel 24 and 25 and through the pipe 6 into the tank 12. The combs 21 and 23 are secured to the stationary casing A of the dispenser and do not move, whereas the combs 20 and 22 are secured to the dispenser 14 and rotate with the same. The air pump 9 can draw the mixture of air and water through the pipe B only as far as the float 13 provided for in known manner at 11 and said float can lift the valve 26 to close the end of the sucking pipe which said valve is shown as engaged in Fig. 1. In such condition and under a vacuum of any optional height the most essential part of the gas quantities absorbed by the crude water will disengage itself and mingle with the air which separates from the water in the compartment 28 in a regained state, leaving the water poor in foreign dissolved gases as for instance carbonic acid. In the tank 12, sieves 27 are provided through which the water is forced into the compartment 28 and between which coarse and sharp filtering materials such as slags and the like are embedded, that is, if only the elimination of gases is required and no deironing, demanganesing or softening is to be carried out. The air drawn from the tank 12 is forced through the pipe 37 and delivered to the crude water tank 1. The water collected in the tank compartment 28, freed from air and gases is now fed through the pipes 29 and 7, and from there to that compartment of the combined conveying device which is designed as a centrifugal pump and which comprises the stationary parts 30, 31 and 32 of the casing and the centrifugal pump 33 which is rotatable on the shaft 16, the same being separated by a partition C from the dispenser 14. Owing to its shape, the centrifugal wheel 33 sucks the water freed from gases through the pipe 7 and conveys it through the delivery pipe 8 into the clean water tank 2.

If the plant is also intended for freeing the water to be treated from dissolved iron, the mixture of gas and air sucked through the pipe B out of the tank 12, by means of the air pump 9, is fed through the piping 37 into the crude water tank 1. The oxygen amply existing in the mixture of gas and air oxidizes the carbonate of iron contained in the crude water and converts it into ferric-hydroxid and the latter will be precipitated from the liquid in the form of an insoluble, finely divided iron mud. The latter is filtered off either through the sieves 27 in the tank 12 or at any other place of the delivery pipe 28.

I claim:—

1. In a water cleaning apparatus, a casing, a tank positioned above the casing, means for dividing the tank into an upper and a lower compartment, a crude water tank in communication with the casing, a rotary dispenser within the casing having combs disposed on its periphery, said dispenser adapted to draw water from the crude water tank and simultaneously cause air to be mixed therewith, the combs adapted to convert the water and air into a spray and force the same into the lower compartment of the first mentioned tank, and means adjacent said dispenser for forcing the water by centrifugal action into the upper compartment of the first mentioned tank.

2. In a water cleaning apparatus, a casing, a tank positioned above the casing, said tank comprising an upper and a lower compartment, a rotary dispenser within the casing adapted to draw water and air into the casing, means carried by the rotary dispenser for mixing the water and air and causing the same to pass to the lower compartment of the tank, centrifugal means within the casing for drawing the water from said lower compartment and forcing the same into the upper compartment.

3. In a water cleaning apparatus, a casing, a tank positioned above the casing, said tank comprising an upper and a lower compartment, a hollow rotary dispenser positioned within the casing, said dispenser adapted to draw water into the casing, means on the periphery of the said dispenser for breaking up the water, said dispenser having means for admitting air thereto, and adapted to force the air and water into the lower compartment of the tank, and hollow rotary means within the casing for drawing the water from the said lower compartment and forcing the same into the upper compartment.

In testimony whereof, I have affixed my signature in the presence of two witnesses.

HEINRICH WEHNER.

Witnesses:
ALCHRIS VON ROSSNER,
JEAN GRUND.